United States Patent [19]
Hirose et al.

[11] Patent Number: 5,957,806
[45] Date of Patent: Sep. 28, 1999

[54] APPARATUS AND METHOD FOR DISENGAGING A CLUTCH AFTER A SHIFT COMMAND UNLESS A CLUTCH PEDAL IS IN A CLUTCH SLIPPING STATE

[75] Inventors: Yoshito Hirose, Yaita; Kouichi Ikeya, Shioya-gun; Takao Nishina, Kawachi-gun; Masakatu Kenmoku, Shioya-gun, all of Japan

[73] Assignee: Mitsubishi Jidosha Kogyo Kabushiki Kaisha, Tokyo, Japan

[21] Appl. No.: 08/868,989

[22] Filed: Jun. 4, 1997

[30] Foreign Application Priority Data

Jun. 4, 1996 [JP] Japan .................................. 8-142006

[51] Int. Cl.⁶ .................................................. F16D 48/02
[52] U.S. Cl. ............................ 477/79; 192/83; 192/3.58; 477/70
[58] Field of Search ................................ 477/79, 80, 86, 477/88, 81, 82; 192/3.58, 83, 3.52, 3.62

[56] References Cited

U.S. PATENT DOCUMENTS

| | | | |
|---|---|---|---|
| 3,548,981 | 12/1970 | Hill et al. | 192/83 X |
| 4,745,999 | 5/1988 | Brugger et al. | 192/83 |
| 5,002,166 | 3/1991 | Leigh-Monstevens | 192/83 X |
| 5,031,735 | 7/1991 | Holmes | 192/83 X |
| 5,056,632 | 10/1991 | Lemp et al. | 192/3.54 X |
| 5,083,648 | 1/1992 | Bulgrien | 192/3.58 |
| 5,094,079 | 3/1992 | Leigh-Montstevens et al. | 192/83 X |
| 5,217,097 | 6/1993 | Lasoen | 192/3.58 |
| 5,251,733 | 10/1993 | Falk et al. | 192/3.58 X |
| 5,273,143 | 12/1993 | Voss et al. | 192/83 X |

*Primary Examiner*—Charles A Marmor
*Assistant Examiner*—Ankur Parekh

[57] ABSTRACT

A shift control apparatus for a transmission coupled to a power source via a clutch includes an electronic control unit for delivering a shift command giving instructions for a gear shifting, and a gear shift unit for performing the gear shifting in response to the shift command. The electronic control unit delivers, in association with the shift command, a first clutch stroke command varying between off-clutch and an on-clutch positions. The shift control apparatus includes a hydraulic master cylinder producing a hydraulic pressure which serves as a second clutch stroke command and which varies in accordance with the operational position of a clutch pedal, and an air cylinder unit with a hydraulic cylinder section for switching the clutch between the off-clutch and on-clutch positions. The air cylinder unit operates in accordance with one of the first and second clutch stroke commands which represents a target clutch plate position closer to the off-clutch state. When the clutch pedal is depressed, the cylinder unit brings the clutch into the off-clutch position in response to a supplied hydraulic pressure, thereby permitting a required gear shifting even when the pedal is depressed.

13 Claims, 6 Drawing Sheets

APPARATUS AND METHOD FOR DISENGAGING A CLUTCH AFTER A SHIFT COMMAND UNLESS A CLUTCH PEDAL IS IN A CLUTCH SLIPPING STATE

BACKGROUND OF THE INVENTION

1. Field of the Invention

This invention relates to an apparatus and method for a shift control, and more particularly, to a shift control apparatus and a shift control method for an automotive automatic transmission equipped with a clutch device adapted to be engaged and disengaged in response to both a shift command and a clutch pedal manipulation.

2. Related Art

Automatic transmissions which realize automated gear-shift operations have been widely used as automotive transmissions. Among them, torque converter-equipped automatic transmissions are chiefly used for small vehicles. In large vehicles such as buses and trucks which require a large driving torque, it is difficult for a torque converter to adequately transfer the large driving torque.

In this respect, an automatic transmission equipped with a gear transmission similar in construction to a conventional manual transmission and a clutch adapted to be automatically engaged and disengaged has been developed for use in large vehicles. In the automatic transmission of this kind, the engagement and disengagement of the clutch are automatically controlled in timed relation with a shift timing determined by a shift command, so that a smooth automatic speed change may be achieved.

Another type of an automatic transmission developed hithertofore is provided with a clutch whose engagement and disengagement are not only automatically controllable in response to a shift command but also executable in response to a clutch pedal manipulation by a driver.

The above-mentioned conventional automatic transmission which allows both automatic and manual clutch operations is so designed that the automatic clutch on-off control, i.e., clutch engagement/disengagement control, and the automatic shift control are prohibited so long as the clutch pedal is depressed, whereby a priority is given to a driver's intention such as a driver's clutch-slipping manipulation. With this arrangement, even if a shift command giving instructions for an automatic gear shifting is delivered, neither the clutch on-off control nor the automatic shift control is carried out while the clutch pedal is being depressed.

According to this arrangement which completely prohibits the automatic gear shifting during the depression of the clutch pedal, if an intense braking is applied while the clutch pedal is depressed deeply, an automatic gear shifting is kept prohibited even if a gear position presently established is no longer proper. This entails a problem that a smooth vehicle acceleration cannot be achieved when the driver attempts to accelerate a vehicle after releasing the clutch pedal because a mismatch takes place between the vehicle speed and the gear position established.

SUMMARY OF THE INVENTION

A principal object of the present invention is to provide an apparatus and method which make it possible to carry out a desired gear shifting in a transmission equipped with a clutch which is responsive to a clutch pedal manipulation.

According to one aspect of the present invention, there is provided a shift control apparatus for a transmission coupled to a power source via a clutch. This shift control apparatus comprises: a shift control section for delivering a shift command giving instructions for a gear shifting to a target gear position suited to at least a driving state of the power source; a gear shift unit for performing the gear shifting in response to the shift command supplied thereto from the shift control section; a first clutch control section for delivering, in association with the shift command, a first clutch control command representative of a target clutch operating state which varies between an off-clutch state and an on-clutch state; a second clutch control section for delivering a second clutch control command in response to an operational position of a clutch pedal which is operable by a driver, the second clutch control command representing a target clutch operating state which varies between the off-clutch state and the on-clutch state; and an actuator for switching the clutch between the off-clutch state and the on-clutch state. The actuator is operable in accordance with one of the first and second clutch control commands which represents the target clutch operating state closer to the off-clutch state.

The shift control apparatus of the present invention is advantageous in that the clutch on-off control can be performed in response to both a shift command and a clutch pedal depressing manipulation and that the clutch on-off control can be made in association with the shift control. Accordingly, the gear position in the transmission can be changed over to a target gear position even if the shift command is delivered while the clutch pedal is being depressed. With the prior art in which a gear shifting is prohibited so long as the clutch pedal is depressed, a smooth acceleration after the release of the clutch pedal depression is sometimes hindered since the gear position which is kept unchanged during the clutch pedal depression becomes improper for the subsequent acceleration. The present invention solves this kind of problem encountered in the prior art. Namely, according to the present invention, a gear shifting is accomplished, where required, in a period from a depression of the clutch pedal to a release of the same, e.g., at the time of braking by a braking pedal. Accordingly, a proper gear position can be established immediately after the clutch pedal is released, guaranteeing a smooth vehicle running. If the clutch pedal is released while the automatic clutch control, responsive to the first clutch control command supplied from the first clutch control section, is being carried out together with the associated automatic shift control, then the second clutch control section delivers the second clutch control command that gives instructions for an engagement of the clutch. Even in such a case, the clutch is kept maintained in its off-clutch state as long as the first clutch control command gives instructions for establishing the off-clutch state. This makes it possible to eliminate a problem that a priority is given to the second clutch control command and the clutch is permitted to be engaged.

Preferably, the clutch comprises a clutch plate movable between an off-clutch position and an on-clutch position. The first clutch control section delivers a first clutch stroke command serving as the first clutch control command and representative of a target clutch plate position which varies between the off-clutch position and the on-clutch position. The second clutch control section delivers a second clutch stroke command serving as the second clutch control command and representative of a target clutch plate position which varies between the off-clutch position and the on-clutch position in accordance with the operational position of the clutch pedal. The actuator is operable in accordance with one of the first and second clutch control commands which represents the target clutch plate position closer to the off-clutch position.

With this preferable arrangement, the clutch on-off control can be adequately performed based on the clutch stroke command which represents an accurate target clutch on-off state.

Preferably, each of the target clutch plate positions represented by the first and second clutch stroke commands varies between an on-clutch region including the on-clutch position and its vicinity and an off-clutch region including the off-clutch position and its vicinity. The actuator maintains the clutch in the off-clutch state so long as at least one of the target clutch plate positions represented by the first and second clutch stroke commands falls within the off-clutch region.

With this preferable arrangement, both the clutch on-off control and the shift control can be executed adequately even if a shift command is produced before a clutch pedal depressing manipulation is released. In this case, the first clutch stroke command exits from the on-clutch region and then enters into the off-clutch region while the second clutch stroke command remains in the off-clutch region. Subsequently, the second clutch stroke command exits from the off-clutch region. Thereafter, the first clutch stroke command exits from the off-clutch region and enters into the on-clutch region. The actuator maintains the clutch in the off-clutch state from the time when the second clutch stroke command enters into the clutch-off region to the time when the first clutch stroke command exits from the clutch-off region, to thereby permit a gear shifting. After the gear shifting is accomplished, the clutch is changed over to the on-clutch state.

Preferably, the shift control apparatus further comprises a range detecting section for generating a range signal representative of a range which is selected by a range selecting means attached to the transmission and operable by a driver. The shift control section is permitted to deliver the shift command when a selection of a drive range is determined based on the range signal supplied thereto from the range detecting section.

With this preferable arrangement, an execution of the automatic clutch on-off control and the automatic shift control can be permitted only when the drive range is selected.

Preferably, the first clutch control section cancels a delivery of the first clutch stroke command to the actuator when the first clutch control section determines, immediately after generation of the shift command, that the target clutch plate position falls outside the on-clutch region and the off-clutch region.

With this preferable arrangement, if there is a high possibility that the driver operates the clutch pedal with the intention of slipping the clutch, i.e., operating the clutch in a clutch-slipping state where the clutch is slightly engaged, a useless clutch on-off action and gear shifting can be avoided, whereas the actuator operates in accordance with the second clutch stroke command corresponding to the clutch pedal manipulation. This makes it possible to operate the clutch in a manner reflecting the driver's intention represented by the clutch pedal manipulation.

Preferably, the first clutch stroke command is delivered from the first clutch control section, when the first clutch control section determines, immediately after the generation of the shift command, that the target clutch plate position represented by the second clutch stroke command falls within either one of the on-clutch region and the off-clutch region. Then, the changeover in the operational state of the clutch is started, which changeover is effected by the actuator in accordance with one of the first and second clutch stroke commands. The changeover in the operating state of the clutch, and the gear shifting effected by the gear shift unit are continued until they are completed.

With this preferable arrangement, the clutch on-off control can be continuously performed if once the clutch on-off control is started, even if a clutch pedal is operated later, especially even if the clutch is kept in the clutch-slipping state by the clutch pedal manipulation. As a result, the clutch is maintained in the off-clutch state during the shift control, so that the gear shifting can be accomplished adequately.

Preferably, the actuator includes a movable member coupled to the clutch plate and having first and second pressure-receiving portions. The movable member moves in a direction of causing the clutch plate to move toward the off-clutch position, when a pressure is applied to at least one of the first and second pressure-receiving portions. The clutch includes an urging member which urges the clutch plate toward the on-clutch position. The first and second clutch control sections apply first and second pressures, serving as the first and second clutch stroke commands, to the first and second pressure-receiving portions, respectively. More preferably, the first clutch control section includes a pressurized air source, a switching valve interposed in an air passage through which the pressurized air source is connected with the first pressure-receiving portion of the actuator, and a switching valve actuating means for switching the switching valve between a communicating position where the first pressure-receiving portion is communicated with the pressurized air source and a shut-off position where communication between the first pressure-receiving portion and the pressurized air source is prohibited. The pressurized air source supplies the first pressure-receiving portion with pressurized air serving as the first clutch stroke command when the switching valve is in the communicating position. The second clutch control section includes a hydraulic source for generating a hydraulic pressure which varies depending on the operational position of the clutch pedal, and applies the hydraulic pressure serving as the second clutch stroke command to the second pressure-receiving portion.

With these preferable arrangements, the actuator can be surely operated in accordance with one of the first and second clutch stroke commands which represents a target clutch plate position closer to the off-clutch position.

According to another aspect of the present invention, there is provided a shift control method for controlling a transmission coupled to a power source via a clutch whose operating state is variable between an on-clutch state and an off-clutch state in response to a driver's clutch pedal manipulation. This shift control method comprises the steps of: (a) judging whether an operational position of the clutch pedal falls within either of an off-clutch region and an on-clutch region when a shift command giving instructions for a gear shifting is delivered; (b) actuating the clutch so as to establish the off-clutch state when the step (a) judges that the operational position of the clutch pedal falls within either of the off-clutch region and the on-clutch region; (c) automatically executing the gear shifting in the transmission in accordance with the shift command after the off-clutch state is established; and (d) actuating the clutch so as to establish the on-clutch state after the automatic gear shifting is completed.

The shift control method of the present invention is advantageous in that the clutch on-off control can be performed in response to both a shift command and a clutch pedal depressing manipulation and that an automatic shift control can be carried out in association with the clutch on-off control. Accordingly, even when the clutch pedal is depressed, a required gear shifting can be accomplished, thereby establishing an appropriate gear position immediately after the clutch pedal depression, so that a smooth vehicle traveling is achieved.

Preferably, an execution of the steps (b), (c) and (d) is prohibited when the step (a) judges that the operational position of the clutch pedal falls outside the off-clutch region and the on-clutch region.

According to this preferable shift control method, a useless clutch on-off operation and gear shifting can be avoided, if there is high possibility that a driver operates the clutch pedal with the intention of operating the clutch in a clutch-slipping state.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION

With reference to accompanied drawings, a shift control apparatus according to a preferred embodiment of the present invention will be explained.

Figure 1:
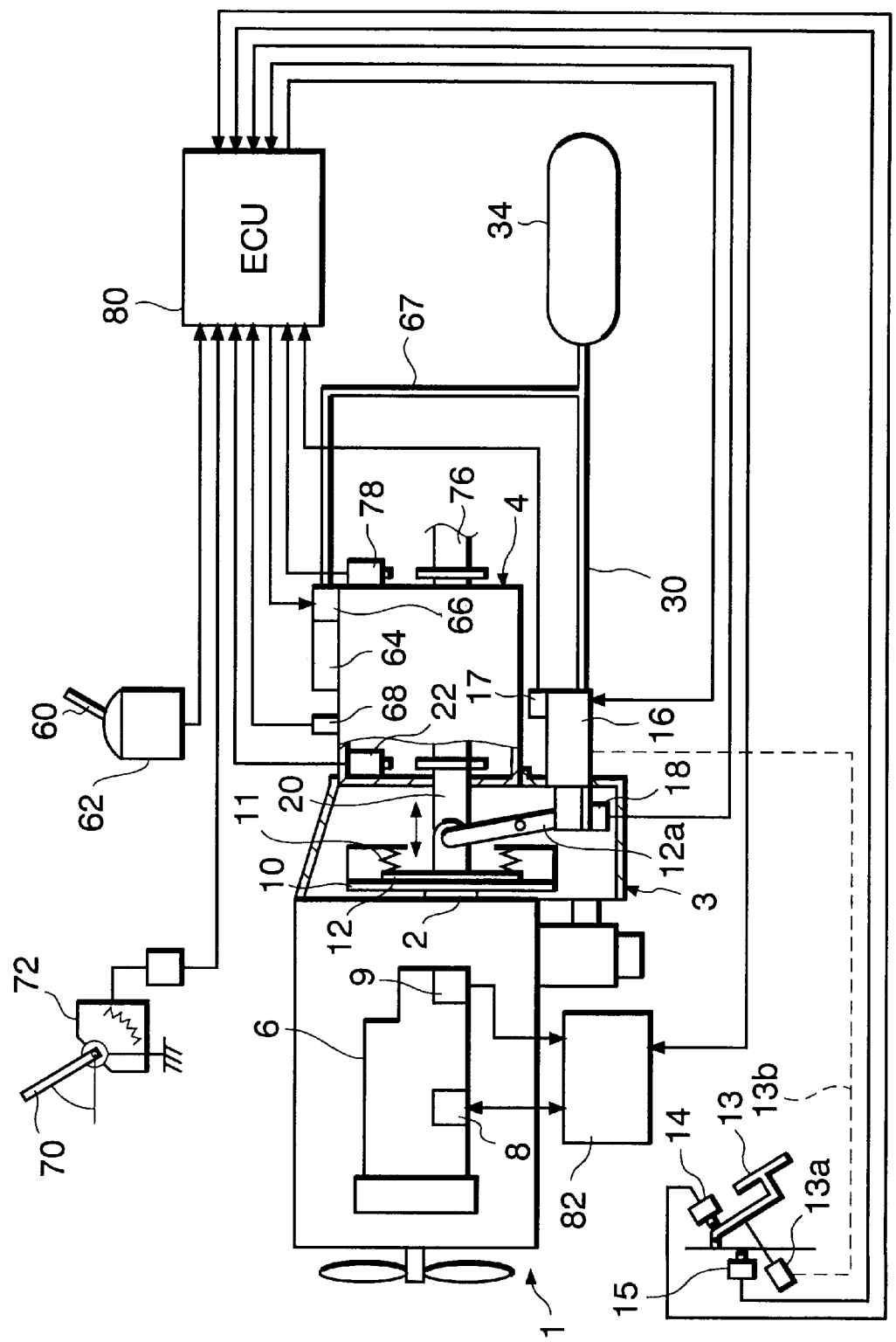
FIG. 1 is a schematic diagram showing an arrangement of a vehicular driving system equipped with a shift control apparatus according to an embodiment of the present invention.

In FIG. 1, a diesel engine 1 (hereinafter referred to as "engine") is shown, which serves as a power source for heavy-load vehicles such as trucks and buses, and which has an output shaft 2 extending therefrom. The engine output shaft 2 is coupled via a clutch device 3 to a gear-train type transmission (hereinafter referred simply to "transmission") 4, so that the output of engine 1 is transmitted to the transmission 4. The gear transmission 4 has seven forward speeds (first speed to seventh speed) and a reverse speed, for instance, and carries out a gear shifting, as needed, to establish a desired speed. The gear transmission 4 is of, e.g., a constant-mesh system having plural pairs of gears. Although not shown in the drawing, each pair of gears is comprised of one gear rotatably mounted on a main shaft of the transmission 4 and the other gear fixed to a countershaft of the transmission. When a shift fork provided in the transmission 4 is moved, a sleeve integrally formed with the shift fork is slid along the main shaft and is engaged with one of gears disposed at both sides of the sleeve whereby the above-mentioned one gear is drivingly coupled via the sleeve to the main shaft, to establish a desired speed. Preferably, the transmission 4 has a synchronizer for eliminating a peripheral speed difference between the main shaft and a gear to be engaged therewith.

As described later, the clutch device 3 is so designed that its engagement and disengagement are automatically controlled while a gear shifting is taking place in the transmission 4. The clutch device 3 and the transmission 4 constitute an automatic transmission.

The engine 1 is provided with a fuel injection pump 6 (hereinafter referred to "injection pump") for supplying fuel to the engine 1. The injection pump 6 has an input shaft (not shown) thereof coupled to the engine 1 and is driven by the engine output transmitted to an input shaft of the pump, thereby injecting the fuel. The injection pump 6 is provided with a control rack (not shown) for adjusting a fuel injection amount, and a rack position sensor 9 for detecting a control rack position RW representing an operational position of the control rack. An engine speed sensor 8 which is provided at a location near the pump input shaft serves to detect the rotational speed of the pump input shaft from which speed the engine speed (i.e., rotational speed of output shaft 2 of engine 1) is detected.

The clutch device 3 has an ability of both manually and automatically achieving the function of an ordinary mechanical friction clutch. More specifically, the clutch device 3 includes a clutch plate 12 which is movable between an on-clutch position where it is in press-contact with a flywheel 10 and an off-clutch position where it is separated from the flywheel 10, and a pressure spring 11 which urges the clutch plate 12 toward the on-clutch position. By operating a clutch actuator (air cylinder unit) 16, the clutch plate 12 is moved from the on-clutch position to the off-clutch position. An on-clutch state of the clutch device 3 is established when the clutch plate 12 is forcibly pressed against the flywheel 10 by the urging force of the pressure spring 11. On the contrary, an off-clutch state of the clutch device 3 is established when the clutch plate 12 is moved away from the flywheel 10 against the urging force of the pressure spring 11 by the operation of the clutch actuator 16. The clutch actuator 16 of this embodiment is comprised of an air cylinder unit with a hydraulic cylinder. The air cylinder unit 16 is coupled to the clutch plate 12 via an outer lever 12a.

The air cylinder unit 16 is communicated to an air tank 34 via an air passage 30 which is constituted by a pipe, for instance, and which serves as an air feed passage. Accordingly, when the pressurized air is supplied from the air tank 34 via air passage 30, the air cylinder unit 16 operates automatically.

When the air cylinder unit 16 is switched from a deactivated state to an activated state, the clutch plate 12 is moved away from the flywheel 10. Thus, the clutch device 3 is changed from the on-clutch state to the off-clutch state. On the other hand, when the air cylinder unit 16 is in the deactivated state, the clutch plate 12 is forcibly pressed against the flywheel 10 by the urging force of pressure spring 11, so that the clutch device 3 is kept maintained in an on state, i.e., an engaged state. As described above, the on-off operation of the clutch device 3 is performed automatically. This automatic on-off clutch operation is performed in timed relation with an associated automatic gear shifting in the transmission 4.

Reference numeral 13 denotes a clutch pedal which is operable by a driver. The clutch pedal 13 is associated with a hydraulic master cylinder 13a that serves as a second clutch control section, the master cylinder being operable in association with a clutch-pedal operation by the driver. Preferably, the hydraulic master cylinder 13a delivers operating oil having a pressurized level corresponding to the operational position of the clutch pedal 13 when the driver operates the clutch pedal. The hydraulic master cylinder 13a is connected to one end, i.e., the upstream-side end as viewed from the air tank 34, of an oil passage 13b. The other end, i.e., the downstream-side end of the oil passage 13b is connected to the air cylinder unit 16. Accordingly, when the clutch pedal 13 is depressed, operating oil is fed from the hydraulic master cylinder 13a to the air cylinder unit 16 via oil passage 13b. In response to this oil supply, the air cylinder unit 16 is activated and the clutch plate 12 is caused to move in the off-clutch direction so that the off-clutch state is established. In this manner, the on-off operation of the clutch device 3 can be performed manually.

Figure 2:
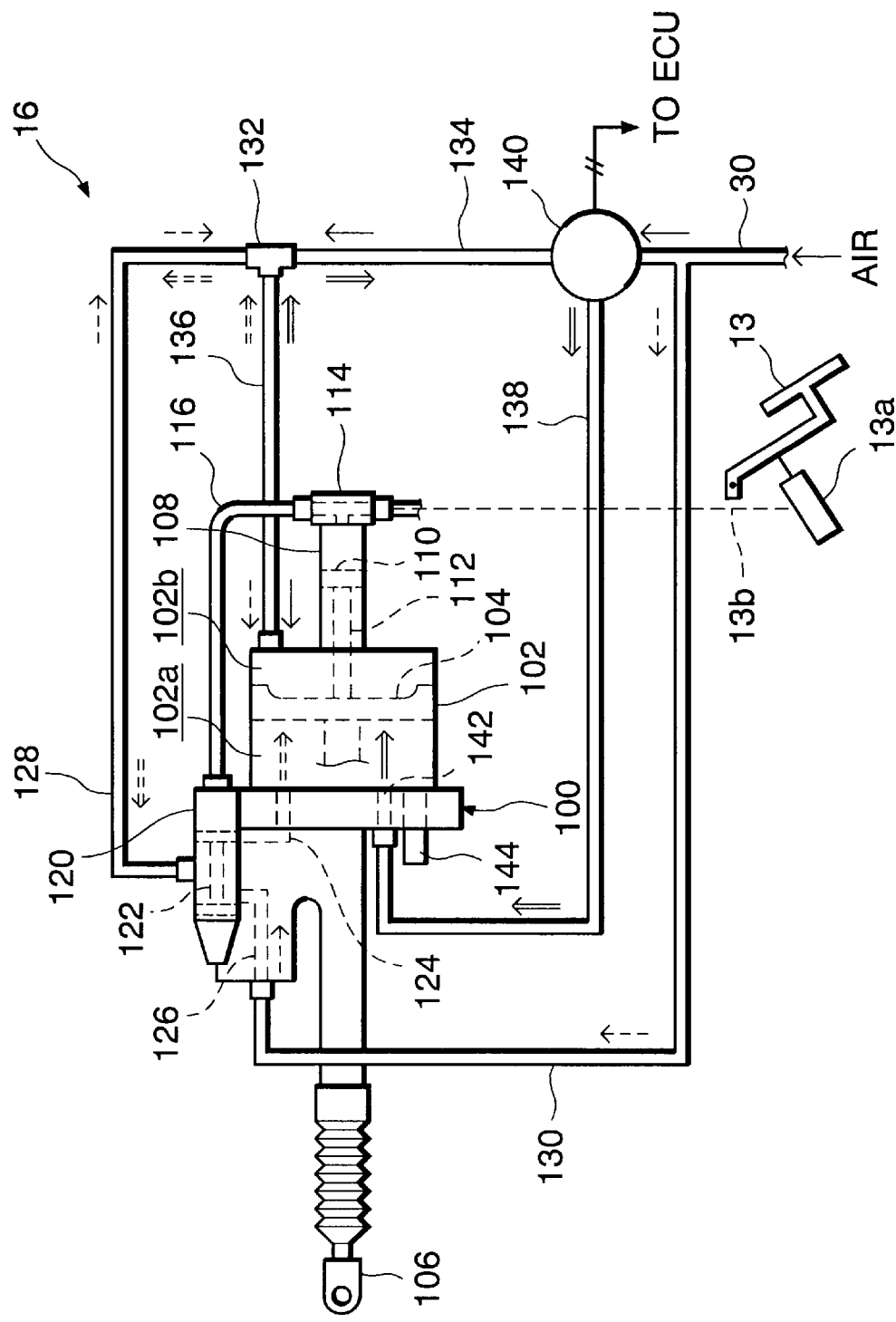
FIG. 2 is a diagram showing a hydraulic circuit of an air cylinder unit shown in FIG. 1.

As shown in FIG. 2, a main body 100 of the air cylinder unit 16, which constitutes a main part of this unit, is provided with an air cylinder section 102 which accommodates therein a power piston 104 for slide motion. An internal space of air cylinder section 102 is partitioned by the power piston 104 into two chambers 102a and 102b. A rod 106 integrally fixed to the power piston 104 is coupled to the clutch plate 12. Accordingly, when the power piston 104 slides to the left in FIG. 2 within the air cylinder section 102, the rod 106 is moved in the same direction. The clutch plate 12, coupled to the rod 106 via the outer lever 12a, is thus moved toward the off-clutch position. On the other hand, when the piston 104 slides to the right in FIG. 2, the clutch plate 12 is moved toward the on-clutch position.

Furthermore, the air cylinder main body 100 is formed with a hydraulic cylinder section 108 integrally with the air cylinder section 102. A hydraulic piston 110 disposed in the hydraulic cylinder section 108 is coupled to the power piston 104 via a hydraulic rod 112 disposed coaxially with the rod 106.

As shown in FIG. 2, the hydraulic cylinder section 108 is connected to a distribution pipe 114 which has an intermediate portion thereof communicating with the interior of the hydraulic cylinder section 108. One end of the distribution pipe 114 is connected to the oil passage 13b, while the other end thereof is connected to an oil passage 116. With this arrangement, when the clutch pedal 13 is depressed, the operating oil is supplied from the hydraulic master cylinder 13a via the oil passage 13b to the distribution pipe 114, and is then distributed by the pipe 114 to the hydraulic cylinder section 108 and to the oil passage 116. The oil passages 13b and 116 can be constituted by a pipe or the like.

A relay valve 120 is integrally mounted on the air-cylinder main body 100. A relay piston 122 is slidably fitted in the relay valve 120. The relay piston 122 has a main part and two piston plates integrally formed therewith.

The relay valve 120 is connected with air passages 124, 126 and 128. More specifically, the air passage 124 is connected with the relay valve 120 at a position close to the air cylinder section 102 as viewed in the axial direction of the relay valve 120. The air passage 128 is connected with the relay valve 120 at a position spaced from the aforementioned junction between the valve 120 and the air passage 124 by a distance which is about one-half of the distance between the two piston plates of the relay piston 122. The air passage 126 is connected with the relay valve 120 at a position spaced from the junction between the valve 120 and the air passage 124 by a distance which is approximately equal to the distance between the piston plates.

When the relay piston 122 is at its sliding position on the side close to the air cylinder section 102, the air passage 124 communicates with the air passage 128. On the contrary, when the relay piston 122 is at its sliding position on the side remote from the air cylinder section 102, the air passage 126 communicates with the air passage 128. In this manner, the relay valve 120 serves as a switching valve for selectively communicating the air passage 128 to either one of air passages 124 and 126.

The air passage 124 extends in the air cylinder main body 100 radially inwardly of the main body from the junction between itself and the relay valve 120, and then extends inward in the axial direction of the main body 100. The air passage 124 has a tip end thereof opening into the chamber 102a. The air passage 126 radially inwardly extends in the air cylinder main body 100, extends outward in the axial direction, and communicates with one end of an air passage 130 which is connected with the air cylinder main body 100. The other end of the air passage 130 is connected to the air passage 30 at a position on the upstream side of the three-way valve 140 as viewed from the air tank 34.

The air passage 128 is connected to a first port of a shuttle valve 132 that serves as a double check valve. The shuttle valve 132 has a second port thereof connected to one port of the three-way valve 140 of an electromagnetic type via an air passage 134 which is comprised of a pipe or the like. Furthermore, an air passage 136, comprised of a pipe or the like, extends from a third port (i.e., central port) of shuttle valve 132. The tip end of the air passage 136 is communicated with the chamber 102b of air cylinder section 102.

The shuttle valve 132 has a function of communicating the air passage 128 with the air passage 136 or communicating the air passage 134 with the air passage 136 in accordance with the pressure balance between the air passages 128 and 134. In other words, the shuttle valve 132 acts as a means for automatically switching the path of air flow.

Remaining two ports of the three-way valve 140 are connected to an end, on the downstream side as viewed from the air tank 34, of the air passage 30 and the upstream-side end of the air passage 138, respectively. The air passage 138 is connected at its downstream end to one end of an air passage 142 formed in the air-cylinder main body 100, and is thus communicated via the air passage 142 to the chamber 102a of air cylinder section 102.

The three-way valve 140 is electrically connected to an electronic control unit (ECU) 80. When three-way valve 140 is activated by an actuation signal supplied from ECU 80, the three-way valve 140 assumes its air-feed position where the air passage 30 is in communication with the air passage 134. When the three-way valve 140 is deactivated in response to the termination of supply of the actuation signal from ECU 80, the three-way valve 140 assumes its air-cut position where the communication between the air passage 30 and the air passage 134 is interrupted. In the air-cut position, the air passages 134 and 138 are communicated with each other.

In FIG. 2, reference numeral 144 denotes an exhaust port that allows the air stored in the chamber 102a to be discharged from the air cylinder section 102.

With the air-cylinder unit 16 constructed as explained above, when the air passage 30 is communicated with air passage 134 through the three-way valve 140 switched to the air-feed position, air (the flow of which is shown by solid arrow in FIG. 2) is supplied to the chamber 102b of air cylinder section 102. In this case, the power piston 104 is pushed toward the chamber 102a. Thus, the rod 106 moves in the protruding direction. This protruding movement of rod 106 causes the clutch plate 12 to move toward the off-clutch position, so that the off-clutch state is established.

When the air passage 134 is communicated with air passage 138 through the three-way valve 140 switched to the air-cut position, the clutch plate 12 is pushed back by the urging force of pressure spring 11 and returned to the on-clutch position. In response to this clutch plate movement to the on-clutch position, the power piston 104 is pushed toward the chamber 102b. Then, the air stored in the chamber 102b flows along a path indicated by a double solid arrow in FIG. 2. Accordingly, the pressure in the chamber 102a is substantially equalized with the pressure in the chamber 102b. Thus, the power piston 104 smoothly slides in the air cylinder section 102 without receiving any air pressure resistance. Hence, when the three-way valve 140 takes the air-cut position, the on-clutch state is established smoothly.

When the clutch 13 is depressed, the operating oil is supplied from the hydraulic master cylinder 13a to the hydraulic cylinder section 108 via oil passage 13b. Upon receiving the operating oil pressure, the hydraulic piston 110 is moved leftward in FIG. 2. With this piston movement, the rod 106 moves in the same direction, and the clutch plate 12 moves to the off-clutch position. Upon feeding of operating oil to the hydraulic cylinder section 108, the operating oil is also supplied to the relay valve 120 via oil passage 116. In response to the supply of operating oil, the relay piston 122 operates to communicate the oil passage 126 with the air passage 128. In this case, as shown by a dotted arrow in FIG. 2, air is introduced from the air passage 30 into the chamber 102b via air passages 130, 126, 128 and 136, so that the power piston 104 is pushed leftward in FIG. 2. When the clutch pedal 13 is depressed, therefore, the rod 106 is pushed to the left (i.e., in the protruding direction) by both the air pressure and the hydraulic pressure.

Thereafter, when the clutch pedal 13 is released from the depressed state, the clutch plate 12 is returned to the on-clutch position by the urging force of the pressure spring 11, and the power piston 104 is pushed toward the chamber 102b. Thus, the operating oil stored in the hydraulic cylinder section 108 and in the relay valve 120 is returned to the master cylinder 13a. With this oil returning action, the relay piston 122 is returned to its original position so that the air passage 124 is communicated with the air passage 128. Hence, the air stored in the chamber 102b is supplied to the chamber 102a via air passages 136, 128 and 124, as indicated by a double dotted arrow in FIG. 2. Accordingly, the pressure in the chamber 102a is substantially equalized with the pressure in the chamber 102b, as in the case of the automatic operating mode, so that the power piston 104 slides smoothly in the air cylinder section 102 without receiving any air pressure resistance.

Referring to FIG. 1 again, adjacent to the clutch pedal 13, there are provided a first clutch pedal position sensor 14 for detecting that the clutch pedal 13 is at a completely released position or its vicinity and a second clutch pedal position sensor 15 for detecting that the clutch pedal 13 is at a most-depressed position or its vicinity. These position sensors 14 and 15 are cooperative to properly detect the operational position of the clutch pedal 13.

Figure 3:
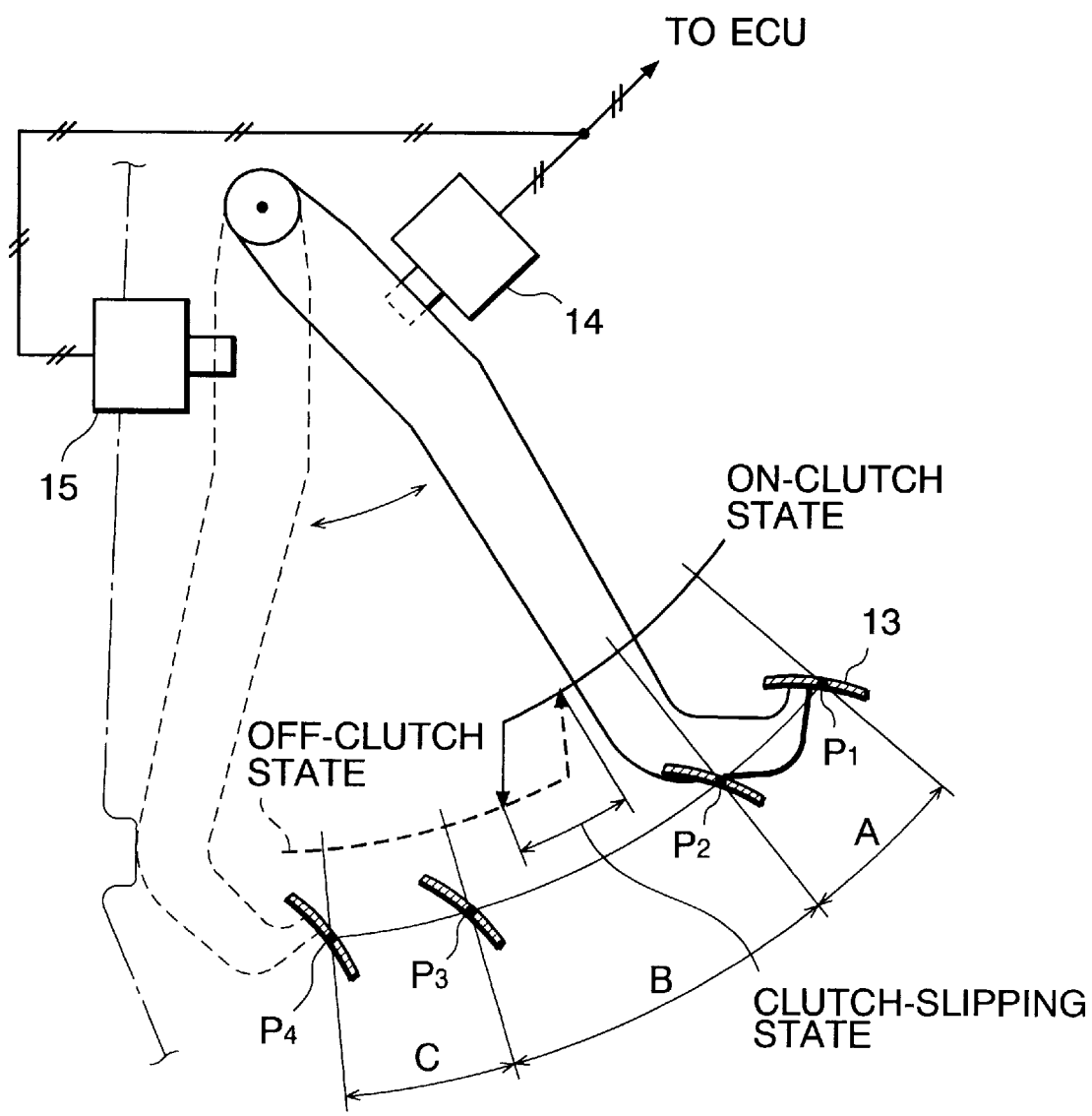
FIG. 3 is a schematic view showing an on-clutch region, a clutch-slipping region and an off-clutch region of a clutch pedal, together with two clutch depression sensors.

Referring to FIG. 3, a relationship between a depression/release operational position of clutch pedal 13 and the on-off state of clutch device 3 will be explained. In the following, it is being supposed that no clutch on-off operation by the automatic clutch control is performed.

In FIG. 3, symbols P1 through P4 respectively denote four positions assumed by the clutch pedal 13 in the course of a depressing/releasing operation of clutch pedal 13. Symbol P1 indicates a completely-released position of clutch pedal 13 (indicated by a solid line in FIG. 3), and symbol P4 indicates a most-depressed position of clutch pedal 13 (indicated by a dotted line in FIG. 3).

In the course of depressing the clutch pedal 13 from the completely-released position P1, even if the clutch pedal reaches the pedal position P2, the clutch pedal 13 is in a released state, and hence the clutch device 3 is still maintained in the on-clutch state. If the clutch pedal 13 is further depressed from the pedal position P2, the clutch device 3 changes from the on-clutch state to a clutch-slipping state where the clutch device 3 is slightly engaged, and then changes from the clutch-slipping state to the off-clutch state, as indicated by a solid arrow in FIG. 3, before the clutch pedal 13 reaches the pedal position P3. On the other hand, in the releasing process of clutch pedal 13 from the most-depressed position P4, even when the clutch pedal reaches the pedal position P3, the clutch pedal 13 is in a depressed state and hence the clutch device 3 is still maintained in the off-clutch state. If the clutch pedal 13 is further released, the clutch device 3 changes from the off-clutch state to the clutch-slipping state and then changes to the on-clutch state, before the pedal position P2 is reached, as indicated by a dotted arrow in FIG. 3.

Accordingly, the clutch device 3 is maintained in the on-clutch state (engaged state) so long as the clutch pedal 13 remains within a first clutch pedal positional region "A" ranging between the pedal positions P1 and P2. In a second clutch pedal positional region "B" ranging between the pedal positions P2 and P3, the clutch device 3 is permitted to be changed over between the on-clutch state and the off-clutch state. Further, the clutch device 3 is maintained in the off-clutch state (disengaged state) so long as the clutch pedal 13 remains within a third clutch pedal positional region "C" ranging between the pedal positions P3 and P4.

In view of the aforementioned relationship between the clutch pedal position and the clutch on-off state, the first clutch pedal position sensor 14 is designed to be turned ON when the clutch pedal 13 is in the first region "A" and to be turned OFF when the clutch pedal is positioned in the second or third region "B" or "C." On the other hand, the second clutch pedal position sensor 15 is designed to be turned ON when the clutch pedal 13 is in the third region "C" and to be turned OFF when the clutch pedal is in the first or second region "A" or "B". With this arrangement, when the first pedal positional sensor 14 is turned ON and the second pedal positional sensor 15 is turned OFF, it is detected that the clutch pedal 13 is in the first region "A" and hence the clutch device 3 is in the on-clutch state. When both the first and second pedal positional sensors 14 and 15 are turned OFF, it is detected that the clutch pedal 13 is in the second region "B" and hence the clutch device 3 is quite likely to be in the clutch-slipping state. When the first pedal positional sensor 14 is turned OFF and the second pedal positional sensor 15 is turned ON, it is detected that the clutch pedal 13 is in the third region "C" and the clutch device 3 is in the off-clutch state.

The air cylinder unit 16 for effecting the on-off control of the clutch device 3 is provided with a clutch stroke sensor 17 for detecting a moving amount of clutch plate 12, i.e., clutch stroke SCL, and a clutch touch sensor 18 for detecting that the clutch plate 12 is in urged contact with the flywheel 10. Furthermore, a clutch rotational speed sensor 22 is provided adjacent to an input shaft 20 of the transmission 4 to detect the rotational speed of input shaft 20, i.e., clutch rotational speed.

A change lever (i.e., select lever) 60 is manually operable along a given select pattern (not shown). By operating the change lever 60, an arbitrary one of neutral range, reverse range, and drive range can be selected, for instance.

The change lever 60 is connected to a range select switch 62 for detecting a selected range as a result of a manipulation of change lever 60. The range select switch 62 is connected to the ECU 80 which is connected to a gear shift unit 64 for establishing a desired gear-coupling in the transmission 4. When a range detecting signal is fed from the range select switch 62 to ECU 80, the gear shift unit 64 operates under the control of ECU 80 to thereby establish a desirable gear-coupling in the transmission 4.

More specifically, the gear shift unit 64 comprises electromagnetic valves (although only one valve is shown at 66 in FIG. 1) operable in response to an operation signal fed from ECU 80 and power cylinders (not shown) for operating shift forks (not shown) provided in the transmission 4. The power cylinders of the gear shift unit 64 are connected to the aforementioned air passage 30 via the electromagnetic valves 66 and an air passage 67. These power cylinders are operable in response to the supply of pressurized air from the air tank 34. More specifically, when the ECU 80 delivers an operation signal to designated electromagnetic valves 66, associated power cylinders respond to the operation signal and operate to change the gear-coupling in the gear transmission 4, as needed.

A gear position switch 68, serving as a gear position sensor for detecting the selected gear position, is provided adjacent to the gear shift unit 64. A gear position signal, representing the presently established gear position, is delivered from the gear position switch 68 to ECU 80.

An accelerator pedal 70 is associated with an accelerator opening degree sensor 72. A speed sensor 78 for detecting the vehicle speed is provided adjacent to an output shaft 76 of the transmission 4.

In FIG. 1, reference numeral 82 designates an engine control unit which is provided independently of the electronic control unit (ECU) 80. The engine control unit 82 receives a signal produced by the ECU 80 based on pieces of information supplied from the aforementioned various sensors, accelerator pedal opening degree information and the like. This signal is delivered from the engine control unit to an electronic governor (not shown) provided in the injection pump 6, for control of the drive of the engine 1. Specifically, upon supply of the signal from the engine control unit 82 to the electronic governor, the control rack operates to increase or decrease the fuel injection amount, thereby increasing or decreasing the engine rotational speed.

ECU 80 is comprised of a micro computer (CPU), memories, and interfaces acting as an input/output signal processing circuit.

ECU 80 is connected at its input side with engine speed sensor 8, rack position sensor 9, pedal positional sensors 14, 15, clutch stroke sensor 17, clutch touch sensor 18, clutch rotational speed sensor 22, range select switch 62, gear position switch 68, accelerator opening degree sensor 72, vehicle speed sensor 78, and the like, and receives pieces of information therefrom.

ECU 80 is connected at is output side with electromagnetic valves 66, engine control unit 82, three-way valve 140, and the like.

The memories of the ECU 80 are comprised of a read-only memory (ROM) and a random-access memory (RAM). Various programs and data are stored in ROM. For example, ROM stores various shift maps used to determine a target gear position based on vehicle speed, accelerator opening degree, and engine speed.

When the ECU 80 receives a range signal supplied from the range select switch 62 and representing that the drive range is selected, the ECU 80 selects an appropriate shift map, and determines a target gear position based on vehicle speed, accelerator opening degree, and engine speed, with reference to the selected shift map. Then, the ECU 80 supplies the gear shift unit 64 with a shift signal which is determined by the present gear position and the target gear position. In response to the supply of this shift signal, corresponding electromagnetic valves 66 in the gear shift unit 64 cooperatively establish the target gear position. In this manner, an automatic shift control is carried out.

In the following, an automatic shift control performed by the shift control apparatus having the aforementioned construction will be explained in detail.

Ordinarily, the clutch 13 is not depressed by a driver. In this case, upon determination of the target gear position, the ECU 80 sends out a shift command (gear shifting command), determined by the present gear position and the target gear position, to corresponding electromagnetic valves 66 in the gear shift unit 64. At the same time, an actuation signal is fed to the three-way valve 140. In short, if a shift control is initiated in response to the supply of a shift signal, a switching control of the three-way valve 140 is performed in association with this shift control.

As a result, the air cylinder unit 16 is automatically operated substantially at the same time of the initiation of the shift control. Thus, the clutch plate 12 is moved away from the flywheel 10, thereby bringing the clutch device 3 into the off-clutch state. Subsequently, if the target gear position is almost established, the three-way valve 140 is controlled in an appropriate manner. For example, an on-off duty ratio of the three-way valve 140 may be properly controlled to gradually reduce the feed amount of pressurized air, so that the clutch plate 12 is gradually brought in pressed-contact with the flywheel 10, whereby the clutch device 3 is brought in the engaged state again.

In executing the shift control, a depressed state of the clutch pedal 13 is taken into consideration. As described above, when the drive range (i.e., D range) is selected, the air cylinder unit 16 is automatically actuated to perform an automatic clutch on-off control, even if the clutch pedal 13 is not operated by the driver, thereby permitting the execution of automatic gear shifting. Meanwhile, the air cylinder unit 16 also responds to a depression of clutch pedal 13, as described above. In this embodiment, in accordance with the depressed state of clutch pedal 13, a determination is made as to whether an automatic shift control should be permitted or prohibited.

Table 1 shows a relation among the operation of clutch pedal 13, the automatic shift control, and the automatic clutch on-off control (the latter two are referred to "auto-shift" and "auto-clutch" in Table 1). In Table 1, "region A", "region B," and "region C" respectively denote the first, second and third positional regions of the clutch pedal 13 shown in FIG. 3. Furthermore, a mark "○" indicates an execution of the automatic shift control or the automatic clutch control, while a mark "—" indicates a non-execution of the same.

TABLE 1

| Range mode | Item | Clutch Pedal Position | | |
| --- | --- | --- | --- | --- |
| | | Region A | Region B | Region C |
| D range | Auto-shift | ○ | — | ○ |
| | Auto-clutch | ○ | — | ○ |

As apparent from Table 1, the clutch pedal 13 can be determined as being in a disengaged state when the clutch pedal position falls within the region "A". Hence, in this condition, both the automatic shift control and the automatic clutch on-off control are performed properly.

Similarly, when the clutch pedal position falls within the region "C", both the automatic shift control and the automatic clutch on-off control are performed properly.

On the other hand, when the clutch pedal position falls within the region "B", it is considered that the driver intentionally brings the clutch device 3 into a clutch-slipping state. Accordingly, in this region "B", a priority is given to the operation of the clutch pedal 13. In other words, no automatic clutch on-off control is performed, and the automatic shift control is prohibited to avoid an undesirable gear shifting.

Figure 4:
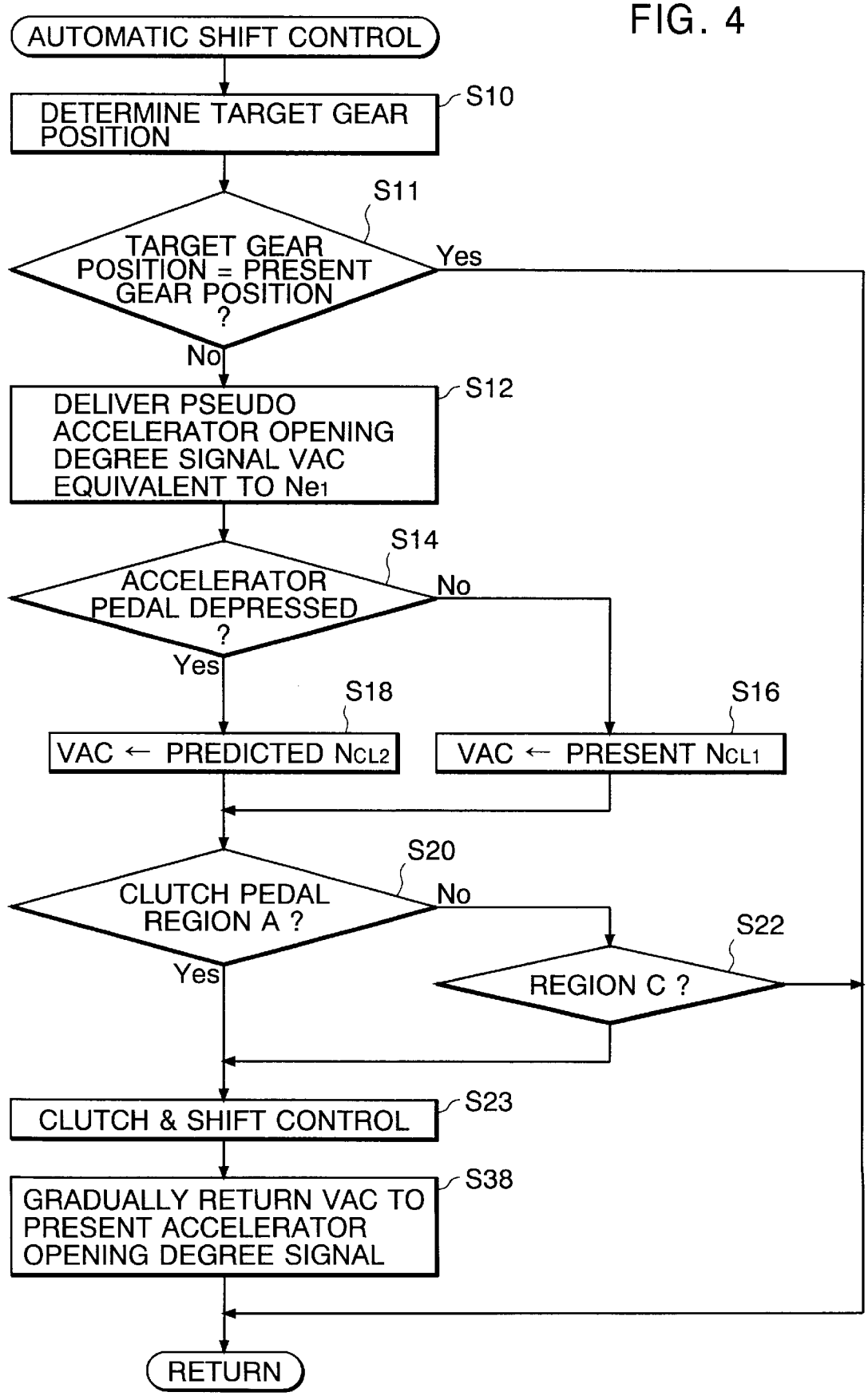
FIG. 4 is a flowchart showing an automatic shift control routine relating to a downshifting.

With reference to FIG. 4, a procedure for an automatic shift control executed by ECU 80 will be explained.

The following is an explanation of an automatic shift control for a case where a downshifting is done. For an upshifting, substantially the same automatic shift control as the below-mentioned control is carried out.

First, in step S10, if the range select switch 62 delivers a range signal indicating that the drive range is selected, a target gear position is determined based on vehicle speed, accelerator opening degree or engine speed, with reference to a shift map. Next, in step S11, it is determined whether the presently established gear position (hereinafter referred to "present gear position") is equal to the target gear position. When the judgment result in step S11 is YES, i.e., when the present gear position is the same as the target gear position, the automatic shift control routine of FIG. 4 for the present control cycle is terminated without executing the processes of step S12 and the subsequent steps. On the other hand, when the judgment result is "NO" in the step S11, i.e., when the present gear position is different from with the target gear position, a shift control is started.

In step S12, a pseudo accelerator opening degree signal VAC is fed to the engine control unit 82. During the shift control, a suitable engine operating state is maintained by the supply of this pseudo accelerator opening degree signal VAC. The pseudo accelerator opening degree signal VAC produced in step S12 is equivalent to an accelerator opening signal required to maintain the present engine speed Ne1. An acceleration opening degree signal used in an engine speed control routine (not shown) is replaced by the thus produced pseudo accelerator opening degree signal VAC, so that the engine speed is adequately automatically controlled, thereby permitting a gear shifting to be progressed appropriately.

In step S14, a judgment is made based on the output signal of accelerator opening degree sensor 72 to determine whether the accelerator pedal 70 is depressed or not. When the judgment result in step S14 is NO, i.e., when the accelerator pedal 70 is not depressed, the control flow proceeds to step S16. In the step S16, the pseudo accelerator opening degree signal VAC set in the step S12 is modified into a value corresponding to a clutch rotational speed, to thereby optimize the engine speed. In this embodiment, the pseudo accelerator opening degree signal VAC is set to a value corresponding to the present clutch rotational speed NCL1.

On the other hand, the judgment result in step S14 is YES, i.e., when the accelerator pedal 70 is depressed, it is considered that the driver requires a large driving torque just after the shift control is finished. In this case, the control flow proceeds to step S18. In the step S18, the pseudo accelerator opening degree signal VAC is set to a value corresponding to a clutch rotational speed NCL2 that is a predicted speed reachable upon completion of the shift control, whereby an adequate acceleration of the engine immediately after completion of the shift control is permitted.

Then, in step S20, a judgment is made to check whether the operational position of clutch pedal 13 falls within the region "A." If the judgment result in step S20 is YES, i.e., the clutch pedal 13 is in a released state, the control flow proceeds to step S23 to execute the clutch and shift control.

When the judgment result in step S20 is NO, the control flow proceeds to step S22. Another judgment is made in this step S22 to check whether the operational position of clutch pedal 13 falls within the region "C." If the judgment result in step S22 is YES, it is determined that the clutch pedal 13 is in a depressed state. In this case, the control flow proceeds to step S23 to execute the clutch and shift control.

On the other hand, when the judgment result in step S22 is NO, i.e., if the operational position of clutch pedal 13 falls outside the regions "A" and "C" and falls within the region "B", the automatic shift control routine of FIG. 4 for the present control cycle is terminated without executing the clutch & shift control of step S23.

Details of the clutch and shift control executed in the step S23 of FIG. 4 will be explained with reference to FIG. 5.

Figure 5:
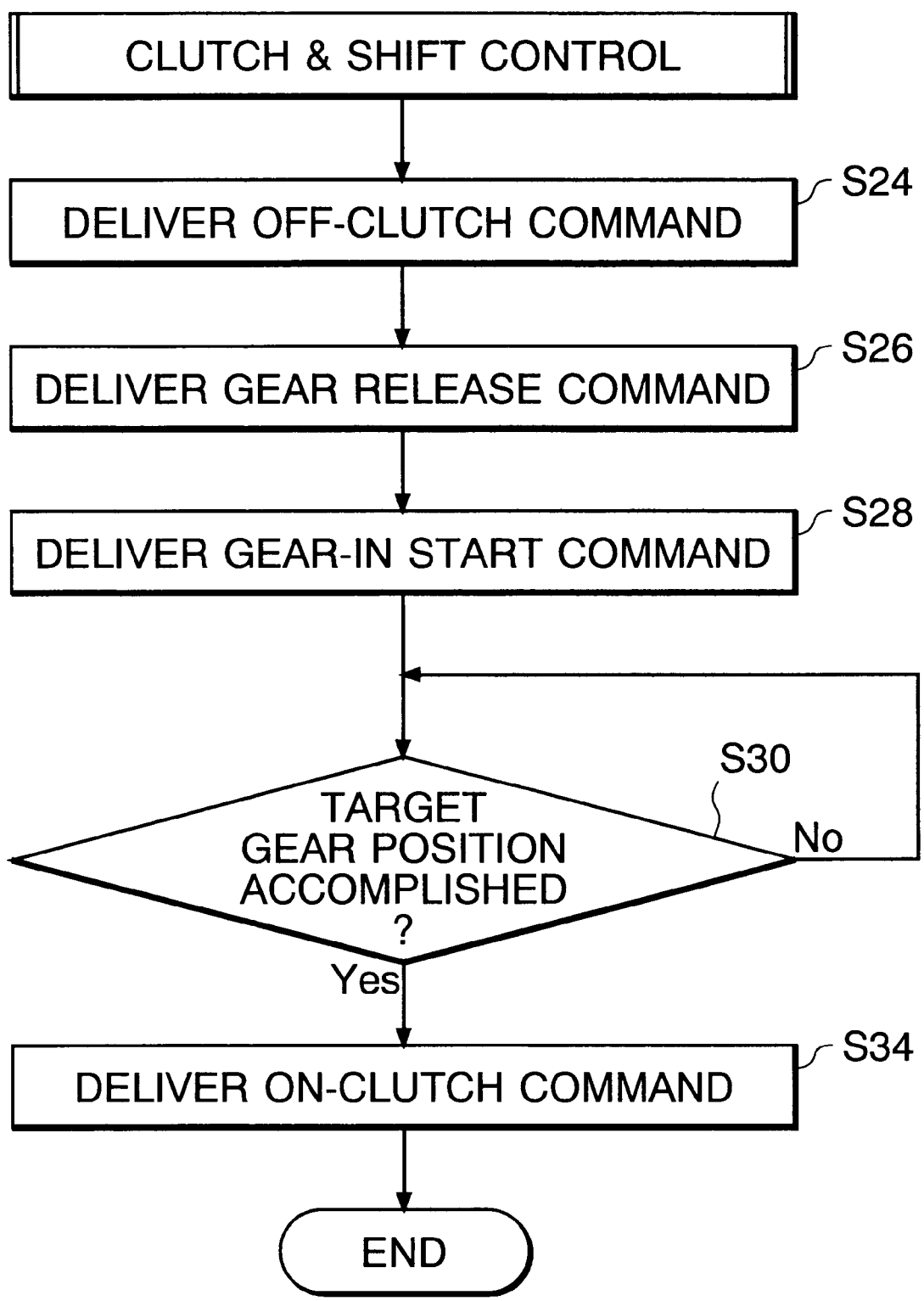
FIG. 5 is a flowchart showing a clutch & shift control subroutine constituting part of the automatic shift control routine shown in FIG. 4.

In step S24 of FIG. 5, an actuation signal corresponding to an off-clutch command is delivered to the three-way valve 140 whereby the three-way valve 140 assumes the air-feed position, so that pressurized air is supplied from the air tank 34 to the chamber 102b of air cylinder unit 16 and the air cylinder unit 16 is activated. As a result, the clutch plate 12 is moved toward the off-clutch position, so that the clutch device 3 is automatically disengaged.

At step S26, in order to change the gear-coupling in the transmission 4, a gear release command is produced to release the engagement between a gear corresponding to the present gear position and the main shaft of the transmission 4. More specifically, an actuation signal is sent to associated electromagnetic valves 66 of the gear shift unit 64. As a result, a shift fork moves from its position corresponding to the present gear position to the neutral position, thereby releasing the engagement between the aforementioned gear and the main shaft of the transmission 4.

Next, in step S28, a gear-in start command is delivered, which gives instructions for connection between another gear corresponding to the target gear position and the main shaft of the transmission 4. More specifically, an actuation signal is sent to an associated electromagnetic valve 66 of the gear shift unit 64. As a result, the movement of the shift fork from its neutral position to its position corresponding to the target gear position.

Next, in step S30, a judgment is made to check whether the target gear position has been established as a result of an accomplishment of the gear-in operation. More specifically, a determination is made as to whether or not the gear position indicated by a gear position signal delivered from the gear position switch 68 is equal to the target gear position. If the judgment in step S30 is NO, i.e., if the gear-in operation is not completed as yet, the ECU awaits the completion of gear-in operation. After the start of movement of the shift fork, if a peripheral speed difference between the aforementioned another gear and the transmission main shaft is eliminated, for instance, the above-mentioned gear is coupled to the transmission main shaft via a sleeve of the shift fork, so that the target gear position is established.

If it is determined that the target gear position has been established, the control flow proceeds to the next step S34. In the step S34, an on-clutch command is delivered. More specifically, supply of the actuation signal having been delivered to the three-way valve 140 as a result of execution of step S24 is terminated. In response to the termination of actuation signal supply, the clutch plate 12 is pushed back to the on-clutch position by the resilient force of pressure spring 11. Thus, the clutch device 3 is brought into an engaged state again.

After the clutch and shift control subroutine of FIG. 5 is completed, the control flow returns to step S38 in the automatic shift control routine of FIG. 4. In the step S38, the pseudo accelerator opening degree signal VAC, having been fed to the engine control unit 82, is gradually changed so as to be equalized with the present accelerator opening degree. With this control, the engine speed is controlled properly, while a gear shifting is accomplished without causing any shock.

As understood from the foregoing description, ECU 80 has a function of a shift control section for carrying out the processes in steps S26, S28 and S30 and another function of a first clutch control section for carrying out the processes in steps S24 and S34.

Figure 6:
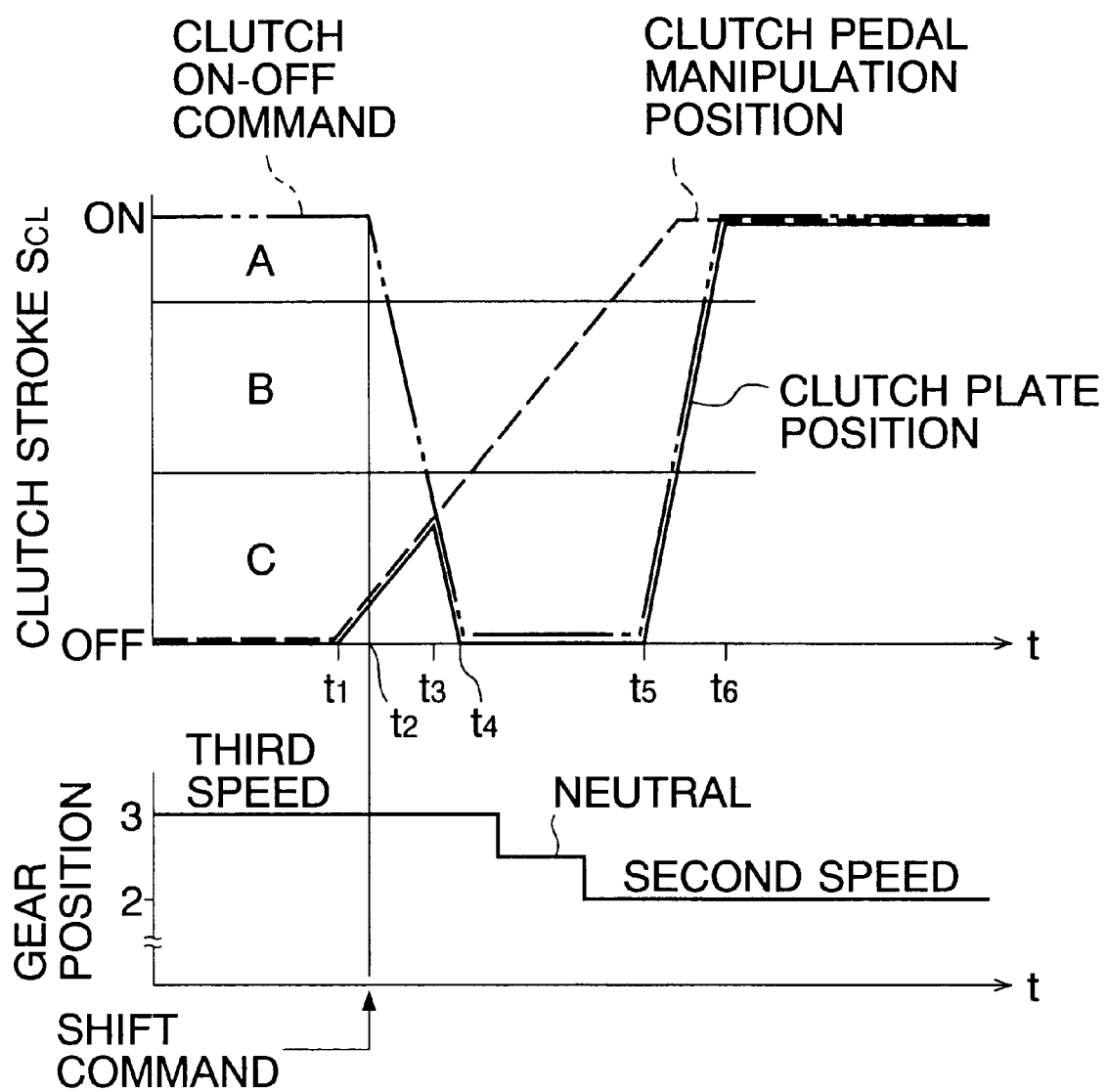
FIG. 6 is a graph showing changes of a clutch on-off command and a clutch stroke SCL with elapse of time, together with a gear shifting process, in a case where the clutch pedal is in the off-clutch region at the time a shift command is generated.

FIG. 6 shows time-based changes of the clutch on-off command and the clutch stroke SCL and the process of gear shifting in a case where the judgment result in step S22 is YES, i.e., in a case where a shift command is delivered when the operational position of the clutch pedal 13 falls within the region "C". The clutch stroke SCL represents an actual moving position of the clutch plate 12. The clutch on-off command (first clutch stroke command) corresponds to the off-clutch command and on-clutch command sent out in the steps S24 and S34 of FIG. 5. In FIG. 6, symbols "A", "B" and "C" denote the clutch stroke regions (clutch stroke command regions) corresponding to the first, second and third clutch pedal manipulation regions "A", "B" and "C" shown in FIG. 3, respectively.

FIG. 6 shows clutch on-off control and downshifting control from the third speed to the second speed for the case where a releasing operation of clutch pedal 13 is started immediately before the shift command is delivered.

In FIG. 6, before the time point of t1 is reached, the clutch pedal 13 is at the most-depressed position (position P4 in FIG. 3). In other words, the clutch pedal 13 falls within the third clutch pedal positional region "C". This clutch pedal depressing operation indicates that the clutch should be disengaged. Thus, the hydraulic master cylinder 13a (second clutch control section), responsive to a clutch pedal manipulation, supplies a hydraulic pressure (second clutch stroke command) for establishing the off-clutch state to the hydraulic cylinder section 108 of the air cylinder unit 16. At the time point of t1, a releasing operation of clutch pedal 3 is started. A target clutch plate position, represented by the hydraulic pressure, varies from the off-clutch position to the on-clutch position, as indicated by a broken line in FIG. 6.

During monitoring a change in vehicle driving states caused by a clutch pedal depressing operation, if the shift control section (ECU 80) judges that there is a necessity of performing a downshifting from the third gear position to the second gear position, it delivers a shift command for a 3-2 shift (time point of t2). In response to this shift command, the first clutch control section (ECU 80) sends out a clutch on-off command (off-clutch command in this case) that gives a target clutch plate position (shown by a two dotted chain line in FIG. 6) which varies from the on-clutch position to the off-clutch position. More specifically, the three-way valve 140 is switched from the air-cut position to the air-feed position, and hence supply of pressurized air to the air cylinder unit 16 (actuator) is initiated. In response to the feed of pressurized air, the air cylinder unit 16 urges the clutch plate 12 toward the off-clutch position.

In a period from time point of t2 to time point of t3, the target clutch plate position indicated by the hydraulic pressure is closer to the off-clutch position than the target clutch plate position indicated by the clutch on-off command (pressurized air). In this case, the air cylinder unit 16 chiefly responds to the hydraulic pressure. As a result, the actual moving position of clutch plate 12 varies in a manner following a change in the hydraulic pressure, as shown by a solid line in FIG. 6. During this period, the clutch device 3 is maintained in the off-clutch state, although the moving position of clutch plate 12 changes slightly from the off-clutch position toward the on-clutch position.

In a strict sense, since the air cylinder unit 16 receives both the hydraulic pressure and the pressurized air in the period from time t2 to t3, the clutch plate 12 is urged up to a moving position closer to the off-clutch position than that observed when only the hydraulic pressure is applied to the cylinder unit.

After the time point of t3, the target clutch plate position indicated by the clutch on-off command (pressurized air) is closer to the off-clutch position than the target clutch plate position indicated by the hydraulic pressure. Accordingly, the air cylinder unit 16 chiefly responds to the pressurized air. As a result, the actual moving position of clutch plate 12 varies in a manner following a change in the pressurized air. Thus, in the period from time point of t3 to time point of t4, the clutch plate 12 is further urged toward the off-clutch position. While the off-clutch state is maintained in this manner, a changeover from the third speed to the neutral takes places, and subsequently a changeover from the neutral to the second speed takes place.

At the time point of t5, i.e., after completion of the 3-2 shift, the target clutch plate position indicated by the clutch on-off command changes from the off-clutch position to the on-clutch position. More specifically, the three-way valve 140 is switched from the air-feed position to the air-cut position, to thereby stop the supply of the pressurized air. As a result, the clutch plate 12 is pushed back toward the on-clutch position by the resilient force of pressure spring 11. Then, at the time point of t6 or its vicinity, the on-clutch state is established.

The clutch on-off command varies from an OFF level corresponding to the on-clutch state to an ON level corresponding to the off-clutch state, or varies from the ON level to the OFF level. In FIG. 6, the target clutch plate position represented by the clutch on-off command varies, with a steep inclination, between the off-clutch position and the on-clutch position. This inclination period represents a time period required for the pressurized air to rise or fall at the time of on-off control of valve 140, i.e., a time period required for clutch plate movement.

Repeatedly speaking, when a releasing operation of the clutch pedal 13 is started, the air cylinder unit 16 operates in such a manner that it follows the releasing operation of clutch pedal 13. The clutch pedal 13 still remains in the region "C" at the moment the shift command is delivered. Thus, as shown in Table 1, the air cylinder unit 16 operates to establish a clutch-off state again in accordance with the clutch on-off command indicated by a two dotted chain line in FIG. 6. Accordingly, even if the clutch pedal 13 is released to the region "A" via the region "B", the air cylinder unit 16 is maintained, irrespective of the operation of clutch pedal 13, in an off state, i.e., a disengaged state in accordance with the clutch on-off command indicated by the two dotted chain line shown in FIG. 6, as long as the shift control is carried out.

In other words, even if the clutch pedal 13 remains in the region "C", the automatic clutch on-off operation is adequately performed in the same manner as in the case where the clutch pedal 13 is in the region "A." Thus, a gear shifting is surely and properly accomplished in case, for example, that the driver applies a braking while depressing the clutch pedal 13 and hence the vehicle speed decreases, because a shift control once started in response to a shift command is never canceled even if a releasing operation of the clutch pedal 13 is initiated thereafter.

As explained in detail in the above and as apparent from Table 1 and results of execution of the step S22 in FIG. 4, the shift control apparatus according to the present embodiment permits the execution of both the automatic clutch on-off operation and the automatic shift operation, if the D range is selected and if the operational position of the clutch pedal 13 is in either of the regions "A" and "C".

Although a gear shifting may start immediately after initiation of a returning operation of the clutch pedal 13, the gear shifting is surely accomplished without being interrupted, irrespective of the releasing operation of the clutch pedal 13, as long as the clutch pedal 13 remains in the region "C" at the start of the gear shifting. Hence, even in the case where the driver causes the vehicle speed to decrease by applying a braking while depressing the clutch pedal 13, a gear shifting is accomplished surely and adequately in response to a shift command, without being interrupted. Therefore, when the clutch pedal 13 is returned to a completely-released state, the gear position of transmission 4 has been already shifted to a target (i.e., optimum) gear position suitable to the vehicle speed and the accelerator opening degree, so that the drivability is improved.

The present invention is not limited to the above-described embodiment and may be modified variously.

For example, a constant-mesh type transmission employed in the embodiment may be replaced by a transmission including planetary gear units.

The combined hydraulic-and-pneumatic type clutch device disclosed in FIG. 3 can be replaced by a hydraulic type, a pneumatic type, or an electromagnetic type clutch device.

The clutch and shift control shown in FIG. 5 is based on an assumption that the clutch pedal is normally released before the control of FIG. 5 is accomplished even when the depression operation of the clutch pedal is started after start of this control. In order to surely continue the clutch and shift control of FIG. 5 once started until it is finished, irrespective of whether the clutch pedal is depressed, the arrangement of the hydraulic-cylinder-equipped air cylinder unit 16 shown in FIG. 2 and the control procedure shown in FIG. 5 can be modified. For example, a circulating path is provided, which has one end thereof communicating with the oil passage 13b and the other end thereof communicated via a reservoir to the hydraulic master cylinder 13a. This circulating path is provided with a switch valve disposed on the side close to the oil passage 13b. If the clutch pedal is depressed during a time period from the initiation to the end of the control of FIG. 5, the above-mentioned switch valve is opened, whereby the hydraulic pressure of the hydraulic master cylinder 13a is permitted to escape to the circulating path. This arrangement is effective to stop a feeding of hydraulic pressure from the hydraulic master cylinder 13a to the air cylinder unit 16 in response to a depression of the clutch pedal, in the period from the start to the end of the control of FIG. 5.

A step of waiting an accomplishment of the off-clutch operation may be provided between step S24 of FIG. 5 relating to the generation of the off-clutch command and step S26 relating to the generation of the gear-in start command. In this case, for example, an accomplishment of the off-clutch operation is detected based on an output of the clutch touch sensor 18. When the accomplishment of the off-clutch operation is confirmed, the control flow proceeds to the step S26.

A step of waiting an accomplishment of the on-clutch operation may be provided after the step S34 relating to the generation of the on-clutch command. In this case, an accomplishment of the on-clutch operation is detected based on the output of the clutch touch sensor 18. When the accomplishment of the on-clutch operation is confirmed, the control flow proceeds to the step S38 of FIG. 4.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A shift control apparatus for a transmission coupled to a power source via a clutch, the clutch including a clutch plate movable between an off-clutch position and an on-clutch position, the apparatus comprising:

a shift control section for delivering a shift command for shifting a gear to a target gear position at least suitable for a driving state of the power source;

a gear shift unit for shifting the gear to the target gear position in response to the shift command supplied thereto from said shift control section;

a first clutch control section for delivering, in association with the shift command, a first clutch control command representative of a target clutch operating state which varies between an off-clutch state and an on-clutch state;

a second clutch control section for delivering a second clutch control command in response to an operational position of a clutch pedal, which is operable by a driver, the second clutch control command representing a target clutch operating state which varies between the off-clutch state and the on-clutch state; and an actuator for switching the clutch between the off-clutch state and the on-clutch state, said actuator being operable in accordance with the one of the first and second clutch control commands which represents the target clutch operating state closer to the off-clutch state, wherein said first clutch control section delivers a first clutch stroke command serving as the first clutch control command and representative of a target clutch plate position which varies between the off-clutch position and the on-clutch position, said second clutch control section delivers a second clutch stroke command serving as the second clutch control command and representative of a target clutch plate position which varies between the off-clutch position and the on-clutch position in accordance with the operational position of the clutch pedal, and said actuator is operable in accordance with the one of the first and second clutch control commands which represents the target clutch plate position closer to the off-clutch position, and wherein each of the target clutch plate positions represented by the first and second clutch stroke commands varies between an on-clutch region including the on-clutch position and its vicinity and an off-clutch region including the off-clutch position and its vicinity, and said actuator maintains the clutch in the off-clutch state so long as at least one of the target clutch plate positions represented by the first and second clutch stroke commands falls within the off-clutch region.

2. The shift control apparatus according to claim 1, wherein said first clutch control section cancels a delivery of the first clutch stroke command to said actuator when said first clutch control section determines, immediately after generation of the shift command, that the target clutch plate position falls outside the on-clutch region and the off-clutch region.

3. The shift control apparatus according to claim 2, further comprising:

a pedal position detecting section for generating a signal representative of the operational position of the clutch pedal;

wherein said first clutch control section judges whether the target clutch plate position falls within at least one of the on-clutch region and the off-clutch region based on the operational position of the clutch pedal detected by said pedal position detection section.

4. The shift control apparatus according to claim 1, wherein the first clutch stroke command is delivered from said first clutch control section and changeover in the operational state of the clutch is started, when said first clutch control section determines, immediately after the generation of the shift command, that the target clutch plate position represented by the second clutch stroke command falls within either one of the on-clutch region and the off-clutch region;

the changeover in the operating state of the clutch and the gear shifting effected by the gear shift unit are continued until they are completed.

5. The shift control apparatus according to claim 4, further comprising:

a pedal position detecting section for generating a signal representative of the operational position of the clutch pedal;

wherein said first clutch control section judges whether the target clutch plate position falls within at least one of the on-clutch region and the off-clutch region based on the operational position of the clutch pedal detected by said pedal position detecting section.

6. The shift control apparatus according to claim 1, wherein said actuator includes a movable member coupled to the clutch plate and having first and second pressure-receiving portions, said movable member moves in a direction of causing the clutch plate to move toward the off-clutch position, when a pressure is applied to at least one of said first and second pressure-receiving portions, the clutch includes an urging member which urges the clutch plate toward the on-clutch position, and said first and second clutch control sections apply first and second pressures, serving as the first and second clutch stroke commands, to said first and second pressure-receiving portions, respectively.

7. The shift control apparatus according to claim 1, wherein said first clutch control section includes a pressurized air source, a switching valve interposed in an air passage through which the pressurized air source is connected with a first pressure-receiving portion of the actuator, and a switching valve actuating means for switching said switching valve between a communicating position where said first pressure-receiving portion is communicated with said pressurized air source and a shut-off position where communication between said first pressure-receiving portion and said pressurized air source is prohibited, said pressurized air source supplies said first pressure-receiving portion with pressurized air serving as the first clutch stroke command when said switching valve is in the communicating position, and said second clutch control section includes a hydraulic source for generating a hydraulic pressure which varies depending on the operational position of the clutch pedal, and applies a hydraulic pressure serving as a second clutch stroke command to a second pressure-receiving portion of the actuator.

8. The shift control apparatus according to claim 1, the transmission including a range detecting section for generating a range signal representative of a range which is selected by a range selecting means attached to the transmission and operable by a driver, wherein said shift control section delivers the shift command when a selection of a drive range is determined based on the range signal supplied thereto from said range detecting section.

9. The shift control apparatus of claim 1, further comprising:

a first sensor which outputs a signal when the clutch pedal is in a first position corresponding to the on-clutch state; and a second sensor which outputs a signal when the clutch pedal is in a second position corresponding to the off-state.

10. A shift control apparatus for a transmission coupled to a power source, comprising:

a clutch provided between the power source and the transmission, said clutch including a clutch plate movable between an off-clutch position and an on-clutch position;

a shift control section for delivering a shift command for shifting a gear to a target gear position determined based on a driving state of the power source;

a gear shift unit for shifting the gear to the target gear position in response to the shift command;

a first clutch control section for delivering, in association with the shift command, a first clutch control command representative of a target clutch operating state which varies between an off-clutch state and an on-clutch state;

a second clutch control section for delivering a second clutch control command in response to an operational position of a clutch pedal, which is operable by a driver, the second clutch control command representing a target clutch operating state which varies between the off-clutch state and the on-clutch state; and an actuator for switching the clutch between the off-clutch state and the on-clutch state, said actuator being operable in accordance with the one of the first and second clutch control commands which represents the target clutch operating state closer to the off-clutch state, wherein said first clutch control section delivers a first clutch stroke command serving as the first clutch control command and representative of a target clutch plate position which varies between the off-clutch position and the on-clutch position, said second clutch control section delivers a second clutch stroke command serving as the second clutch control command and representative of a target clutch plate position which varies between the off-clutch position and the on-clutch position in accordance with the operational position of the clutch pedal, and said actuator is operable in accordance with the one of the first and second clutch control commands which represents the target clutch plate position closer to the off-clutch position, and wherein said actuator includes a movable member coupled to the clutch plate and having first and second pressure-receiving portions, said movable member moves in a direction of causing the clutch plate to move toward the off-clutch position, wherein a pressure is applied to at least one of said first and second pressure-receiving portions, the clutch includes an urging member which urges the clutch plate toward the on-clutch position, and said first and second clutch control sections apply first and second pressures, serving as the first and second clutch stroke commands, to said first and second pressure-receiving portions, respectively.

11. The shift control apparatus for a transmission coupled to a power source, comprising:

a clutch provided between the power source and the transmission, said clutch including a clutch plate movable between an off-clutch position and an on-clutch position;

a shift control section for delivering a shift command for shifting a gear to a target gear position determined based on a driving state of the power source;

a gear shift unit for shifting the gear to the target gear position in response to the shift command;

a first clutch control section for delivering, in association with the shift command, a first clutch control command representative of a target clutch operating state which varies between an off-clutch state and an on-clutch state;

a second clutch control section for delivering a second clutch control command in response to an operational position of a clutch pedal, which is operable by a driver, the second clutch control command representing a target clutch operating state which varies between the off-clutch state and the on-clutch state; and an actuator for switching the clutch between the off-clutch state and the on-clutch state, said actuator being operable in accordance with the one of the first and second clutch control commands which represents the target clutch operating state closer to the off-clutch state, wherein said first clutch control section delivers a first clutch stroke command serving as the first clutch control command and representative of a target clutch plate position which varies between the off-clutch position and the on-clutch position, said second clutch control section delivers a second clutch stroke command serving as the second clutch control command and representative of a target clutch plate position which varies between the off-clutch position and the on-clutch position in accordance with the operational position of the clutch pedal, and said actuator is operable in accordance with the one of the first and second clutch control commands which represents the target clutch plate position closer to the off-clutch position, and wherein said first clutch control section includes a pressurized air source, a switching valve interposed in an air passage through which the pressurized air source is connected with a first pressure-receiving portion of the actuator, and a switching valve actuating means for switching said switching valve between a communicating position where said first pressure-receiving portion is communicated with said pressurized air source and a shut-off position where communication between said first pressure-receiving portion and said pressurized air source is prohibited, said pressurized air source supplies said first pressure-receiving portion with pressurized air serving as the first clutch stroke command when said switching valve is in the communicating position, and said second clutch control section includes a hydraulic source for generating a hydraulic pressure which varies depending on the operational position of the clutch pedal, and applies a hydraulic pressure serving as a second clutch stroke command to a second pressure-receiving portion of the actuator.

12. A shift control method for controlling a transmission coupled to a power source via a clutch whose operating state is variable between an on-clutch state and an off-clutch state in response to a driver's clutch pedal manipulation, comprising:

(a) judging whether an operational position of the clutch pedal falls within either of an off-clutch region and an on-clutch region when a shift command for instructing a gear shift is generated;

(b) actuating the clutch to establish the off-clutch state when the step (a) judges that the operational position of the clutch pedal falls within either of the off-clutch region and the on-clutch region;

(c) automatically executing the gear shift in the transmission in accordance with the shift command after the off-clutch state is established; and (d) actuating the clutch to establish the on-clutch state after the automatic gear shifting is completed.

13. The shift control method according to claim 12, wherein an execution of said steps (b), (c) and (d) is prohibited when said step (a) judges that the operational position of the clutch pedal falls outside the off-clutch region and the on-clutch region.

* * * * *